Figure 1:
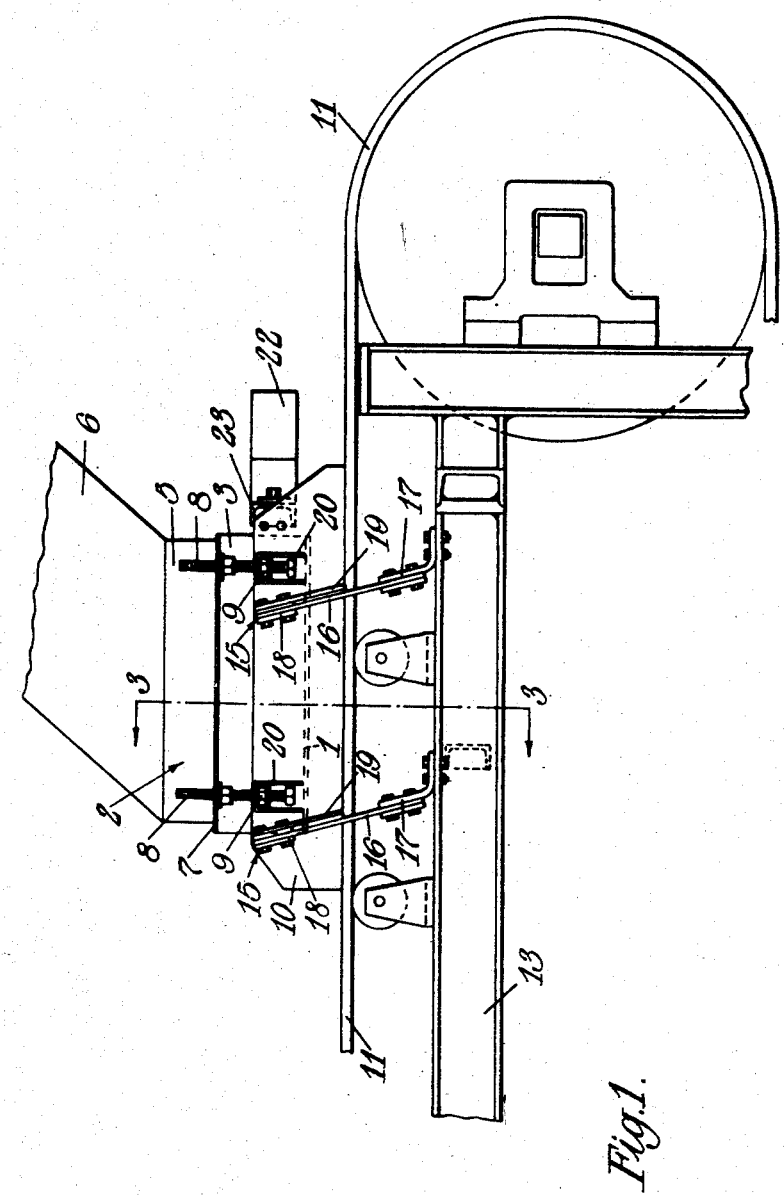

Sept. 21, 1954　　　F. L. KINNEAR　　　2,689,597
APPARATUS AND PROCESS FOR FORMING MATS OF COMMINUTED MATERIAL
Filed Feb. 11, 1952

Inventor
F. L. Kinnear

Sept. 21, 1954  F. L. KINNEAR  2,689,597
APPARATUS AND PROCESS FOR FORMING MATS OF COMMINUTED MATERIAL
Filed Feb. 11, 1952  4 Sheets-Sheet 2

Inventor
F. L. Kinnear

Sept. 21, 1954   F. L. KINNEAR   2,689,597
APPARATUS AND PROCESS FOR FORMING MATS OF COMMINUTED MATERIAL
Filed Feb. 11, 1952   4 Sheets-Sheet 4

Inventor
F. L. Kinnear
By Emert Downing Liebold
Attys.

Patented Sept. 21, 1954

2,689,597

UNITED STATES PATENT OFFICE 2,689,597

APPARATUS AND PROCESS FOR FORMING MATS OF COMMINUTED MATERIAL

Francis Leonard Kinnear, London, England, assignor, by mesne assignments, to Bartrev Limited, Nassau, Bahama Islands Application February 11, 1952, Serial No. 270,979

Claims priority, application Great Britain February 15, 1951

20 Claims. (Cl. 154—1)

This invention relates to methods and means for laying or depositing a mat or layer or required quantity of comminuted material (hereinafter referred to by the term "mat") upon a continuously travelling conveyor or upon a stationary support, the invention being more particularly intended for preparing a mat of comminuted material of the type which has poor "flow" properties and tends to agglomerate, for example wood chips, flakes, fibres, chaff or short shavings. This kind of material will be hereinafter referred to as "chips" and may be untreated or treated with a binder or other liquid or powder suitable for endowing the chips with a predetermined property, for example the chips may be mixed with a powdered synthetic resin for forming under heat and pressure a continuous wallboard, slab or the like.

Difficulties arise in maintaining a steady and even delivery of chips from a hopper or standing head owing to the mating of the individual particles to form innumerable small arches which, although not strong in themselves, cause the flow of such material to be irregular and possible clogging. This is the case even if the opening of a hopper or other discharge equipment is large as external vibration does not reach the whole of the internal cross section or core or, at least, not with the same force. Consequently, even if vibration is applied the existence of the said arches suffices to make the flow so irregular that neither a mat of uniform density nor of an even surface is produceable.

Archbreaking means such as stirrers are known devices but their purpose is usually to break the few and strong arches which stop the flow altogether, but not the many small arches which do not stop the flow but lead to a delivery resulting in uneven surface and density.

The aim of the present invention is to provide a method and means of producing from a supply of comminuted material a mat or laminated mass having an even surface, uniform density, upstanding self-sustaining sides or margins, and of any predetermined exact thickness.

It has long been the practice to use sieves or screens in treating comminuted material for separation purposes, retaining the tailings on the screen with the incidental laying of the siftings in a mat or layer or heap, but the present invention is directed to the employment of a reticulated member not for retention or separation purposes but solely for distributing or laying the whole of the comminuted material as a mat in an even or organized manner by effective archbreaking and securing continuous even discharge from a hopper or head.

The invention consists in forming a mat by superposing a standing supply or head of chips upon a reticulated member having a mesh of a gauge adapted to pass all the chips; positioning the member in a horizontal plane spaced from the intended support for the mat to be produced a vertical distance equal to that predetermined for the thickness of the mat; and vibrating the member preferably in the direction in which translational relative displacement of the support and member is to take place during or at the conclusion of the laying operation. The vibration imparted to the member may be of small amplitude to high frequency or alternatively of relatively large amplitude and low frequency (as described hereafter) according to the material used and the desired mat structure.

The invention further comprises: means for vibrating a reticulated member in contact with a supply or head of chips; means for effecting or allowing horizontal translational relative displacement to take place between the member and the support for the mat to be formed; means for vertically adjusting or positioning the horizontal plane of the member parallel with and at a predetermined spacing interval above the support and equal to that intended for the thickness of said mat; the reticulated member having staggered meshes preferably (a) formed by inclined elements to form staggered diamond-shaped mesh apertures, and (b) disposed with the longer diagonals of the staggered meshes at right-angles to the direction of translational displacement.

It is preferred to employ a reticulated member the mesh apertures of which are directed chutewise obliquely to the perpendicular and inclined in a direction towards that of the said translational displacement.

Further features of the invention consist in providing a frame mounting for the reticulated member having upstanding oppositely disposed cheeks or marginal members extending from the said support upwardly and arranged parallel with the direction of said translational displacement laterally to confine the chips during laying.

Figure 2:
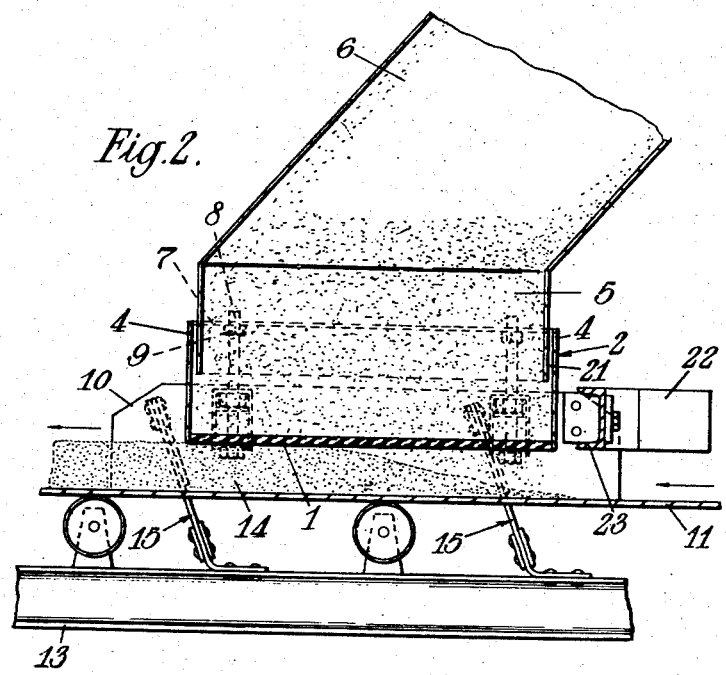
Figure 3:
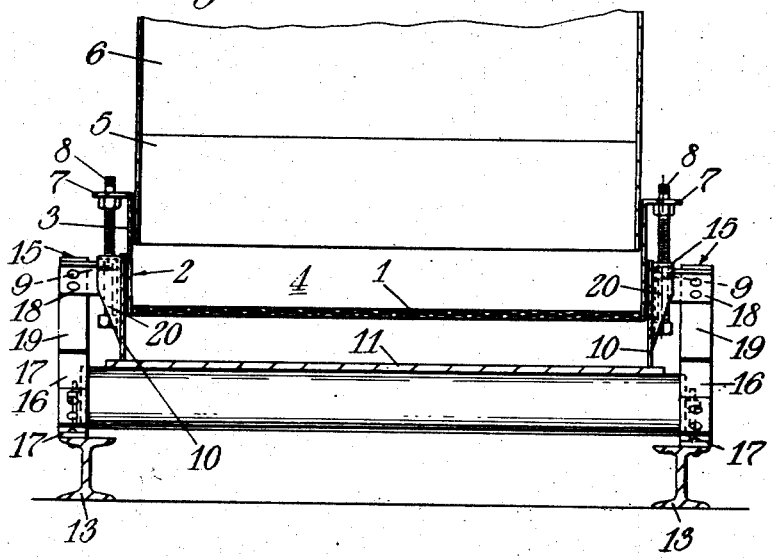
Figure 4:
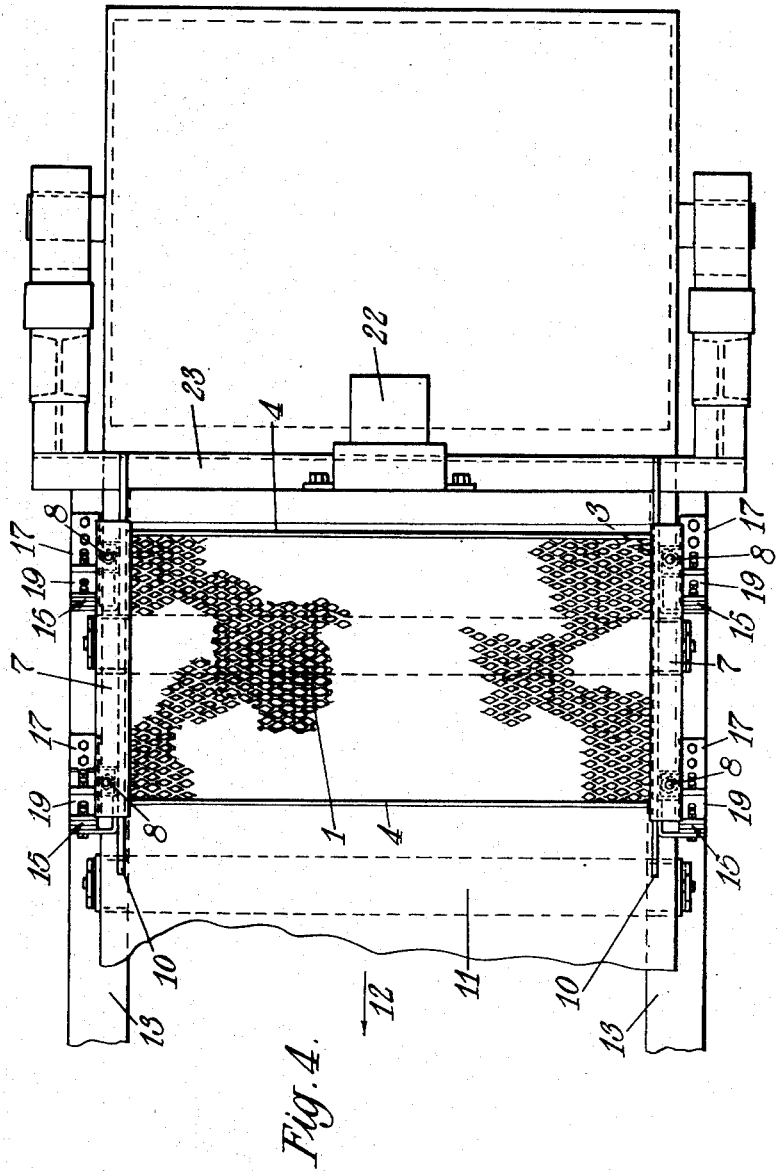
Figure 5:
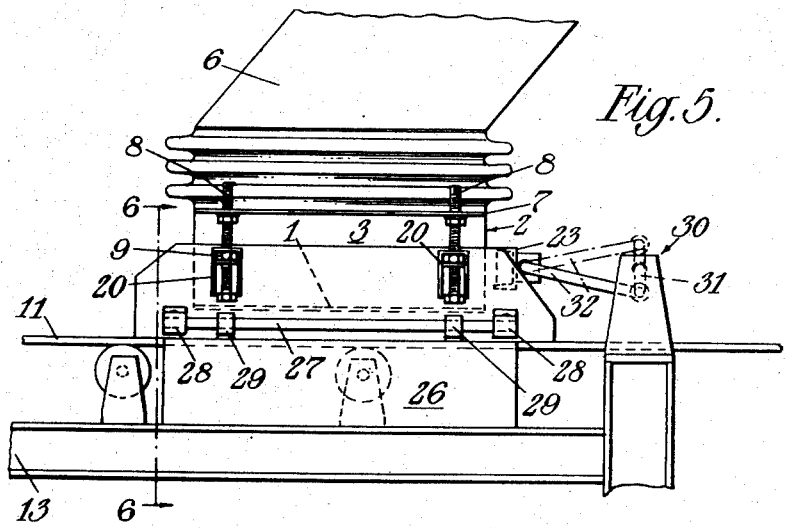
Figure 6:
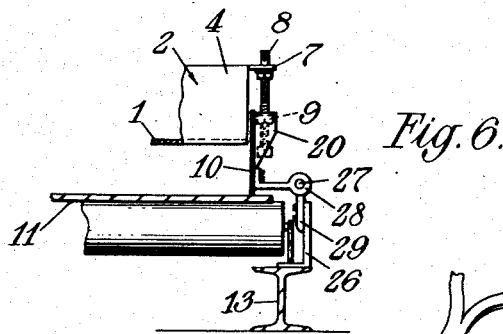
Figure 7:
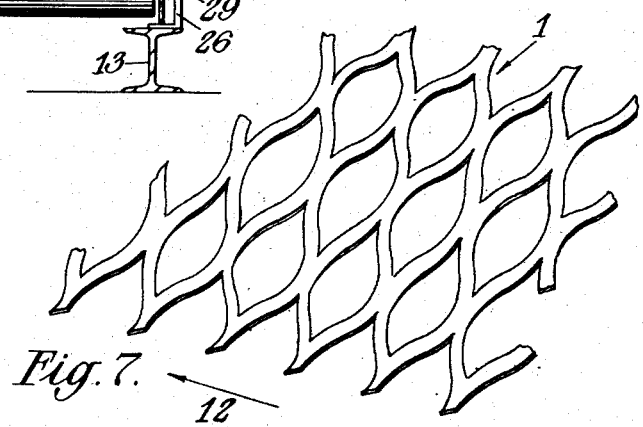

In the accompanying drawings:

Figure 1 is a side elevation of one form of mat laying device according to the present invention, Figure 2 is a sectional side elevation of the device of Figure 1 and showing the deposition of comminuted material, Figure 3 is a transverse sectional view on the line 3—3 of Figure 1, Figure 4 is a plan view of the device shown in Figure 1 with hopper of feed chute removed, Figure 5 is a side elevation of an alternative form of mat laying device according to the present invention, Figure 6 is a fragmentary transverse sectional view on the line 6—6 of Figure 5, and Figure 7 is a perspective view of a preferred form of reticulated member.

In carrying the invention into effect as described by way of example, for disturbing the material at the delivery area of a hopper or the like and for laying a continuous mat or layer of chips intimately mixed with a synthetic thermoplastic or thermosetting binder in powder form for producing wall boarding or the like, a reticulated member 1 of rectangular shape in plan is provided having a width corresponding to the width of the mat to be formed and a length which is chosen according to the desired maximum throughput of chips. The member 1 is of staggered diamond mesh (see particularly Figures 4 and 7) having the features above described. Expanded metal of ¾-inch x 1¼-inches gauge has been found to be very suitable for use with shaving chips of an order averaging about ⅜-inch square and a gauge of 1½-inches x 3½-inches for chips ½-inch to ⅝-inch. The expanded metal sheet member 1 is mounted in a rectangular frame 2 having walls 3 and 4 extending upwardly a suitable distance to mate telescopically with a rectangular sleeve 5, depending from the rectangular mouth of a suitable supply hopper or chute 6 for the chips which is preferably inclined as shown to reduce the weight of the head of chips supported by the member 1. The telescopic arrangement facilitates vertical adjustments of the frame 2 and member 1 with respect to the support (see below) on which the mat is to be laid and with respect to the fixed supply hopper or chute 6. Any suitable means may be provided for adjustably supporting the frame in the desired position vertically spaced from the mat support to predetermine the thickness of mat to be produced, for example, as illustrated the side walls 3 of the frame 2 are formed with outward flanges 7 which carry threaded posts 8 which also engage captive nuts 9 mounted on anchored side frame members 10 (to be described hereafter) so that rotation of the posts 8 causes the frame 2 to be raised or lowered.

The recticulated member and its frame 2 is disposed above a conveyor 11 of the endless travelling band type, with one, preferably the shorter, diagonal of its meshes disposed parallel with the direction of travel of the conveyor 11, shown by arrow 12 in Figures 4 and 7. The vertical dimension of the side frame members 10 should be somewhat greater than the maximum thickness of the mat to be produced, whereby they overlap the walls 3 of the frame 2 at all height adjustments of the frame 2 above the conveyor 11.

Mounted in a manner described hereafter on the supporting structure 13 of the machine are the pair of upstanding lateral walls or cheeks comprising the side frame members 10 mentioned above. The side frame members 10 are intended laterally to confine the chips during the laying operation, leaving the front and rear of the screen delivery open to allow the mat 14 (see Fig. 2) as it is formed to pass forwardly with the conveyor band 11 but the side frame members 10 or similar cheeks may be unnecessary with material having a pronounced flakelike form and tendency to coherent lamination.

Suitable means and connections are provided for imparting to the frame 2 and reticulated member 1 a vibratory or shaking motion, the oscillations of which preferably lie parallel with the direction of travel 12 of the conveyor 11. The vibratory or shaking motion may be imparted either electromagnetically or mechanically (as shown in Figs. 1 or 5 respectively).

Describing firstly an arrangement for imparting vibrations of high frequency and small amplitude to the reticulated member, see Figs. 1 to 4, the side frame members or cheeks 10 are each resiliently fixed or anchored on the supporting structure 13 by a pair of brackets 15 which are capable of limited flexure. Each bracket 15 may comprise, according to one convenient form, a wooden lath or strip 16 secured at its lower end to an anchorage 17 and at its upper end to a second anchorage 18 extending outwardly from the member or cheek 10 and having secured thereto in addition a metal plate or strip 19 extending part way along the length of the wooden lath or strip 16 to reduce or control the free flexibility of the latter. The side frame members or cheeks 10 are thus mounted in parallelism at or adjacent the edges of the conveyor band 11 and are capable of limited vibratory movement in line with their length.

As previously described, the reticulated member 1 and frame 2 are carried on the side frame members or cheeks 10 by the height adjustment device comprising the threaded post 8 engaging the captive nuts 9 which are held between lugs 20 on the side frame members or cheeks 10. Thus vibration imparted to the side frame members or cheeks 10 is transmitted to the frame 2 and the reticulated member 1, a clearance 21 (see Fig. 2) being provided between the rectangular sleeve 5 of the hopper or chute 6 and the front and rear walls 4 of the frame 2.

Vibration is conveniently imparted to the structure as described above by means of any convenient vibrator, for example an electromagnetic vibrator 22, secured to a beam 23 extending between and secured to the side frame members or cheeks 10 at their rear end. The beam 23 also serves as a strut between the side frame members or cheeks 10.

As an alternative to imparting vibratory motion to the reticulated member 1, it can be shaken or oscillated at a much lower frequency and greater amplitude than used for the vibratory method. This increased amplitude requires certain structural modifications (see Figs. 5 and 6) to the structure as previously described, which is otherwise similar, the same references being used for similar or identical parts.

The side frame members or cheeks 10 are each mounted for a sliding oscillatory movement in parallelism with the line of the conveyor on a bracket 26, secured to the supporting structure 13, by means of a rod 27 held in spaced lugs 28 on the side frame members or cheeks 10 and passing through bearings 29 secured on the bracket 26.

The rear ends of the side frame members or cheeks 10 are connected together as before by the beam 23 to which the oscillatory mechanism 30 of the shaker is connected. The oscillatory mechanism may comprise, as illustrated a rotary crank 31 linked by a connecting rod 32 to the beam 23; alternatively the oscillatory motion may be achieved by means of a cam.

In view of the increased amplitude of oscillation, the hopper or chute 6 cannot be connected by a rigid member (e. g. the sleeve 5) to the frame 2 for the reticulated member 1, a flexible coupling is therefore provided in the form of a bellows 33 for example, which allows for movement of the frame 2 both vertically (for adjustment) and horizontally (during oscillation).

In operation, assuming the conveyor band 11 to be stationary and the vibratory means 22 is started up, chips as supplied by the hopper 6 to the reticulated member 1 freely pass through the meshes of the member until the space between the band and the member is entirely filled. Thereafter the flow of material to the band ceases even though vibration of the member continues. When the conveyor band 11 is set in motion the material then continues to fall through the member 1 and is deposited in an even layer of uniform density on the band, the space between the band and the member being filled progressively with the longitudinal displacement of the band as it moves forward. Provided that the total amount of chips drawn away by the band 11 in the form of a mat 14 is not more than the capacity of the reticulated member 1 to supply, the rate at which the chips are fed is controlled entirely by the speed of the conveyor band. The chips falling on the band build up in laminated manner into a mat 14 of uniform density, the lateral margins of which stand vertically as confined by the depending side frame members or cheeks 10 during their deposition, and retain this verticality throughout the travel of the mat upon the conveyor band as it passes away from the laying frame. As indicated above, the discharge from the reticulated member automatically ceases as the mat builds up to the underside of said member, and as the top surface of the mat is drawn away by the band it is smoothed over by the relative motion taking place between the said top surface and the forwardly inclined surfaces defining the meshes of the reticulated member so that the meshes of the reticulated member have an automatic strickling action.

A mat laying device of the above character may also be provided for forming a mat or slab of rectangular form on a stationary support. In this case the support may be a table or board which, when the mat has been completed, is withdrawn, the withdrawing action causing a similar strickling effect on the surface of the mat as already indicated in reference to the forward travel of the conveyor. The laying device in order to cut off the supply of chips, may be fitted with a shutter horizontally slidable between the chips in the hopper and the reticulated member or immediately below and in contact with said member.

The invention may also be applied to the deposition of an even layer or quantity of chips on a stationary or non-continuously moving tray or sheet by substituting such for the conveyor band referred to above. The tray or sheet placed on a table or mounted on horizontal guideways may be filled while it is stationary or while it is being withdrawn. In this and the preceding example a plurality of spaced layers may be deposited simultaneously with the spaces parallel with or transverse to the translational displacement of the supporting surface. The amount of the strickling effect of the reticulated member may be varied by adjusting the rate of transitional movement in relation to the length of the member or its rate of delivery of the strips.

Choice between small amplitude/high frequency and large amplitude/low frequency vibration or shaking is dependent on the nature of the material, type of mat required, speed of conveyor surface and other variables such as the content of binder. In general, the high frequency vibration tends to cause segregation where the material contains a range of particle size. For low frequency operation, a convenient range of frequencies is from 200 to 400 strokes per minute with amplitudes from 2" to 5", a preferred satisfactory frequency for ½-inch soft wood chips is about 300 strokes per minute at an amplitude of 4-inches, these figures are not however limiting.

What I claim is:

1. In a method of laying a mat of comminuted material upon a receiving surface by feeding the material from a source of supply toward the surface, the improvements including interposing a reticulated member between the source and the surface a distance above the surface corresponding to the desired thickness of the mat, feeding the material to pass in toto through the member on to the surface while maintaining a head of material upon the member, imparting relative transverse movement between the source and the surface and simultaneously vibrating the member to distribute the material upon the surface to uniform density and simultaneously strickle the top surface of the material to a mat of uniform depth.

2. In the method of laying a mat as defined in and by claim 1, and vibrating the member at high frequency and with a small amplitude of vibration.

3. In the method of laying a mat as defined in and by claim 1, and vibrating the member at frequencies of between two hundred to five hundred strokes per minute and with an amplitude of movement of between two to five inches.

4. In the method of laying a mat as defined in and by claim 3, wherein the member is vibrated at a frequency of three hundred strokes per minute with an amplitude of four inches.

5. In a method of laying a mat of comminuted material upon a receiving surface by feeding the material from a source of supply toward the surface, the improvements including interposing a reticulated member between the source and the surface a distance above the surface corresponding to the desired thickness of the mat, feeding the material to pass in toto through the member on to the surface while maintaining a head of material upon the member, vibrating the member to distribute the material upon the surface in uniform density until the space between the surface and member is filled and imparting relative transverse movement between the source and the surface while continuing to vibrate the member to elongate the mat being formed and simultaneously strickle the top surface of the material to a mat of uniform depth.

6. A method of laying a mat of comminuted material upon a receiving surface comprising, feeding the material from a source of supply toward the surface to pass in toto through a reticulated member disposed a predetermined distance above the surface, imparting relative transverse movement between the source and the surface while maintaining a head of material upon the member, and simultaneously vibrating the member to distribute the material on the surface to form a mat of uniform density and to simultaneously strickle the top surface of the mat to uniform depth.

7. A method of laying a mat of comminuted material upon an endless conveyor comprising feeding the material through a reticulated member of a mesh such that all of the material can pass therethrough upon the conveyor until the space between conveyor and member is entirely filled, vibrating the member while the material is being fed, thereafter moving the conveyor transversely of and relative to the member while maintaining a head of material upon the member so that the material continues to pass through the member and is deposited as a mat of uniform density upon the conveyor with the space between the conveyor and member being progressively filled as the conveyor moves beneath the member, and the relative movement between conveyor and member uniformly strickling the top surface of the mat to continuously form a mat of uniform thickness.

8. Apparatus for laying a mat of comminuted material upon a receiving surface including supply means for feeding comminuted material, receiving means defining a surface to receive the material, a reticulated member mounted between said first two mentioned means a distance above said receiving means corresponding to the desired thicknesses of mat, said reticulated member having a mesh of a gauge sufficient to pass all the quantity of material therethrough, said supply means including means for maintaining a head of material upon said reticulated member, means for vibrating said reticulated member and means for imparting relative transverse movement between said first two mentioned means whereby material is fed through said reticulated member upon said receiving means to form a mat of uniform density and responsive to the relative transverse movement of said reticulated member strickles the top surface of the mat to uniform depth.

9. Apparatus as claimed in claim 8, and including opposite confining members extending upwardly from said receiving means, said reticulated member being mounted therebetween and said confining members terminating above said reticulated member.

10. Apparatus for laying a mat of comminuted material upon a displaceable receiving surface including a reticulated member having a mesh of a gauge sufficient to pass all of the material therethrough, supply means defining a source of supply of material mounted above the member and including means for maintaining a head of material on the top surface of the member, means mounting the reticulated member above and in parallelism with the displaceable supporting surface a distance equal to the desired thickness of mat, and means for vibrating the reticulated member for depositing material upon the surface to uniform density and for simultaneously strickling to the top surface of the mat to uniform depth as the supporting surface is displaced.

11. Apparatus as claimed in claim 10, in which the means for vibrating the reticulated member vibrate the same in the direction of displacement of the supporting surface.

12. Apparatus as claimed in claim 10, and including means for vertically adjusting the reticulated member above and in parallelism with the supporting surface whereby the thickness of the mat can be variably predetermined.

13. Apparatus as claimed in claim 10, wherein the reticulated member has meshes including elements inclined downwardly toward the supporting surface and arranged to define staggered diamond shaped mesh apertures and disposed with the longer diagonals of the staggered meshes at right angles to the direction of displacement of the supporting surface.

14. Apparatus as claimed in claim 10, in which the supporting surface is displaceable in the given direction and wherein the plane of each of the mesh apertures of the reticulated member is directed obliquely to the perpendicular and inclined in a direction toward that in which the supporting surface is displaced.

15. Apparatus as claimed in claim 10, and including opposite upstanding side frame members disposed laterally on either side of the supporting surface, said reticulated member being disposed between said side frame members, and said side frame members extending upwardly from said supporting surface and terminating above said reticulated member in order to laterally confine the material during laying.

16. Apparatus as claimed in claim 15, and means vertically adjustably connecting the reticulated member to the side frame members so that the thickness of the mat may be adjusted by movement of the reticulated member relative to the side frame members, said side frame members being movable and the means for vibrating the reticulated member being connected to the side frame members to vibrate the same and thereby the reticulated member.

17. Apparatus as claimed in claim 16, and including a main frame, and means flexibly mounting said side frame members to said main frame.

18. Apparatus as claimed in claim 10, in which the supply means includes a hopper having a lower terminal end terminating above the surface, said reticulated member further having upstanding side walls providing a frame with the reticulated member constituting the bottom of the frame, said frame having transverse dimensions in excess of the corresponding dimensions of the terminal end of the hopper, said upstanding side walls of the frame telescopically surrounding said hopper and the difference in the transverse dimensions of the frame relative to the hopper providing clearance therebetween to permit vibratory movement of the frame relative to the hopper.

19. Apparatus as claimed in claim 10, in which the supply means includes a hopper having a lower terminal end terminating above the surface, said reticulated member having upstanding side walls connected thereto so as to provide a frame with the reticulated member forming the bottom thereof, said upstanding side walls being flexible and extensible and connected to the lower terminal end of the hopper to permit vibratory movement of the reticulated member.

20. Apparatus as claimed in claim 10, and further including an endless band conveyor constituting the displaceable surface.

References Cited in the file of this patent

UNITED STATES PATENTS

| Number | Name | Date |
| --- | --- | --- |
| 297,382 | Golding | Apr. 22, 1884 |
| 449,445 | Henry et al. | Mar. 31, 1891 |
| 870,569 | Macdonald et al. | Nov. 12, 1907 |
| 1,461,337 | Weiss | July 10, 1923 |
| 1,667,194 | Craig et al. | Apr. 24, 1928 |
| 2,066,734 | Loetscher | Jan. 5, 1937 |
| 2,067,012 | Loetscher | Jan. 5, 1937 |
| 2,570,367 | Mitten | Oct. 9, 1951 |